US007815112B2

(12) United States Patent
Volpe et al.

(10) Patent No.: US 7,815,112 B2
(45) Date of Patent: Oct. 19, 2010

(54) SECURE PARCEL DELIVERY IN THE ABSENCE OF THE INTENDED RECIPIENT

(75) Inventors: Dante P. Volpe, Penfield, NY (US); Dennis M. Petricoin, Hemlock, NY (US)

(73) Assignee: Robert Bosch GmbH, Stuttgart (DE)

( * ) Notice: Subject to any disclaimer, the term of this patent is extended or adjusted under 35 U.S.C. 154(b) by 188 days.

(21) Appl. No.: 11/965,527

(22) Filed: Dec. 27, 2007

(65) Prior Publication Data

US 2009/0166403 A1 Jul. 2, 2009

(51) Int. Cl.

| | |
|---|---|
| ***G06K 7/01*** | (2006.01) |
| ***G06F 17/00*** | (2006.01) |
| ***G06F 21/00*** | (2006.01) |
| ***B60R 25/00*** | (2006.01) |
| ***G08B 13/14*** | (2006.01) |

(52) U.S. Cl. .................. 235/382.5; 235/375; 340/5.73; 340/568.1; 340/569; 713/182

(58) Field of Classification Search ................ 235/375, 235/382.5
See application file for complete search history.

(56) References Cited

U.S. PATENT DOCUMENTS

| | | | | |
|---|---|---|---|---|
| 5,624,071 | A | 4/1997 | Sosan | |
| 6,300,873 | B1 * | 10/2001 | Kucharczyk et al. | 340/568.1 |
| 6,756,879 | B2 | 6/2004 | Shuster | |
| 6,987,452 | B2 | 1/2006 | Yang | |
| 7,158,941 | B1 | 1/2007 | Thompson | |
| 7,191,932 | B2 | 3/2007 | Fobbe et al. | |
| 7,219,235 | B2 | 5/2007 | Rumble | |
| 7,233,907 | B2 | 6/2007 | Young | |
| 2002/0046130 | A1 * | 4/2002 | Monteleone et al. | 705/26 |
| 2002/0129256 | A1 * | 9/2002 | Parmelee et al. | 713/180 |
| 2002/0138740 | A1 | 9/2002 | Rumble | |
| 2002/0153994 | A1 | 10/2002 | Bonner | |
| 2005/0104730 | A1 | 5/2005 | Yang | |
| 2006/0214770 | A1 | 9/2006 | Capouch et al. | |

FOREIGN PATENT DOCUMENTS

| | | |
|---|---|---|
| GB | 2407128 | 4/2005 |
| WO | 01/39638 | 6/2001 |
| WO | 01/48641 | 7/2001 |
| WO | 01/91074 | 11/2001 |

OTHER PUBLICATIONS 08019566.2 extended European Search Report, 7 pages, dated Nov. 5, 2009.

* cited by examiner

*Primary Examiner*—Michael G Lee
*Assistant Examiner*—Laura Gudorf
(74) *Attorney, Agent, or Firm*—Michael Best & Friedrich LLP

(57) ABSTRACT

Systems and methods are disclosed for securely delivering a parcel when the intended recipient is not present to take physical possession of the parcel. Parcel delivery companies assign a unique tracking number to each parcel. The tracking number is enabled as an access code which, when input by a delivery person, unlocks a secured area such that the parcel can be placed inside.

19 Claims, 11 Drawing Sheets

819

```
<html>
<title> Parcel Delivery Company Web Tracking System </title>

<body>
DATE       LOCATION           STATUS<br>
11/28/07       Milwaukee, WI        
Parcel Picked Up <br>
11/29/07       Chicago, IL         Checked at
Warehouse <br>
11/29/07       Chicago, IL           Out for Delivery

</body>
</html>
```

FIG. 8b

SECURE PARCEL DELIVERY IN THE ABSENCE OF THE INTENDED RECIPIENT

BACKGROUND OF INVENTION

It is common for a parcel delivery company to attempt a delivery only to find that the intended recipient is not available to take possession of the parcel. Traditionally, a delivery person must then either leave the parcel in a non-secured area or attempt delivery at another time. Lockable devices have been previously suggested that allow the delivery person access to a receptacle in which the parcel is securely placed and later retrieved by the recipient. For example, these previously suggested devices require that a recipient provide an access code to the delivery service prior to delivery or utilize a wireless device carried by the delivery person and recognized by the lockable device.

SUMMARY OF INVENTION

Previous devices are not completely satisfactory. Parcel delivery companies are often not equipped to process special instructions such as a recipient-defined access code. Furthermore, other previously suggested solutions, such as a wireless access device, would require a significant change to a parcel delivery company's business processes (e.g., requiring each delivery person to carry a wireless device). Such large-scale implementation would only be feasible if a substantial number of parcel recipients also adopt the device.

On the other hand, most major parcel delivery companies—including UPS™, DHL™, Fed-Ex™, and the U.S. Postal Service—have already adopted the practice of providing a parcel tracking number to a recipient. Among other things, this tracking number allows the recipient to monitor delivery status via an Internet-based interface. To allow the delivery person the ability to update delivery status, the tracking number is also readily accessible to the delivery person—usually directly on the parcel label. However, this tracking number also has characteristics that would be desirable for an access code to a lockable device. For example, the tracking number is unique to each delivery and readily available to the delivery person. Enabling a lockable device to provide access when this tracking number is entered would allow for secured delivery of parcels from multiple carriers without wide-scale revision to the delivery process.

As such, embodiments of this invention provide systems and methods for securing a delivered parcel in the absence of the intended recipient. After the parcel delivery company assigns a tracking number to the parcel and notifies the recipient of the tracking number, that number is used as an access code for a lock. The delivery person inputs the tracking number when delivering the package and a secured area is unlocked in response. After the parcel is placed in the secured area, the secured area is locked with the parcel secured.

In some embodiments, the tracking number is disabled as an access code after it has been used to unlock the secured area, thus preventing subsequent unauthorized accesses by the delivery person.

In some embodiments, the tracking number is enabled as an access code only during limited times such as a preset delivery time window or after receiving notification that the parcel is out for delivery.

In some embodiments, a notification is sent to the recipient when the lock controller is operated—for example, when the secured area is unlocked in response to a correctly entered tracking number.

In some embodiments, the system is connected to the Internet such that it can send and receive emails and interact with Web-based applications. In some such embodiments, the system receives automated emails from the parcel delivery company and parses the email text to derive a tracking number. In other embodiments, the system interacts with the parcel delivery company's Web-based software program to monitor the status of the parcel delivery and enables the tracking number as an access code only after the Web-based software program indicates that the parcel is out with a delivery person for final delivery.

BRIEF DESCRIPTION OF DRAWINGS

FIG. 8*b* shows a portion of the HTML code that might be used to generate the Web-screen shown in FIG. 8*a*.

DETAILED DESCRIPTION

Figure 1B:
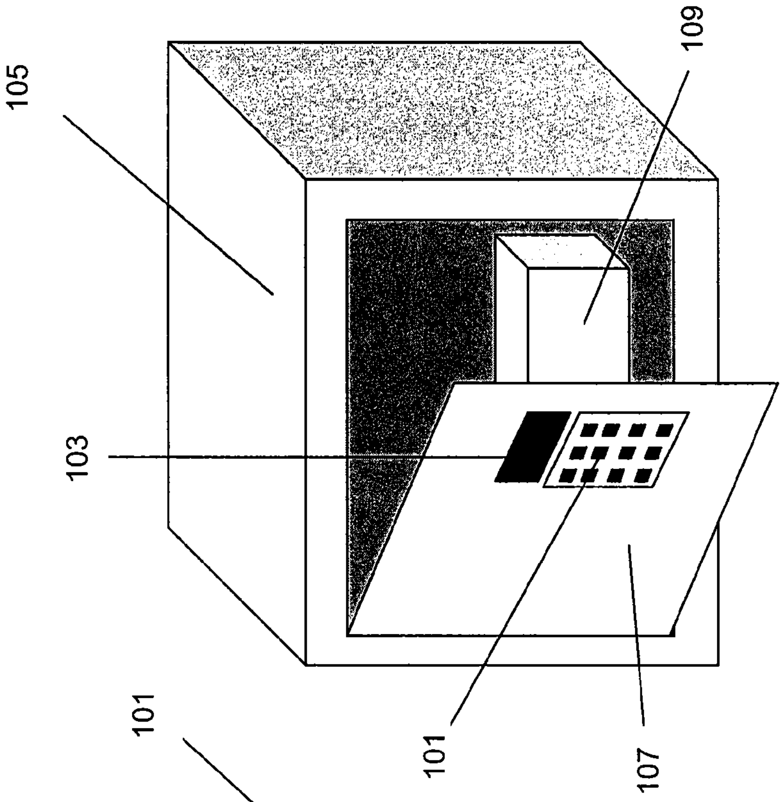
FIG. 1*b* is a perspective view of the same secured receptacle from FIG. 1*a* with an open door and a parcel placed inside.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. It should be noted that a plurality of hardware and software based devices, as well as a plurality of different structural components, may be utilized to implement embodiments of the invention. Furthermore, and as described in the subsequent paragraphs, the specific configurations illustrated in the drawings are intended to exemplify embodiments of the invention, and other alternative configurations are possible.

A tracking number is a unique identifier that is used by the parcel delivery company to track the large volume of parcels in its possession. Although referred to as a tracking "number," numerals, letters, and characters could be used to create a tracking number. It is also current practice to provide a tracking number to the sender and the recipient to allow them to monitor the status of the parcel shipment. This is typically accomplished through a Web-based software application with at least some security features. As such, the tracking number is readily available to both the delivery person and the recipient, but is not, generally, available to others.

Figure 1A:
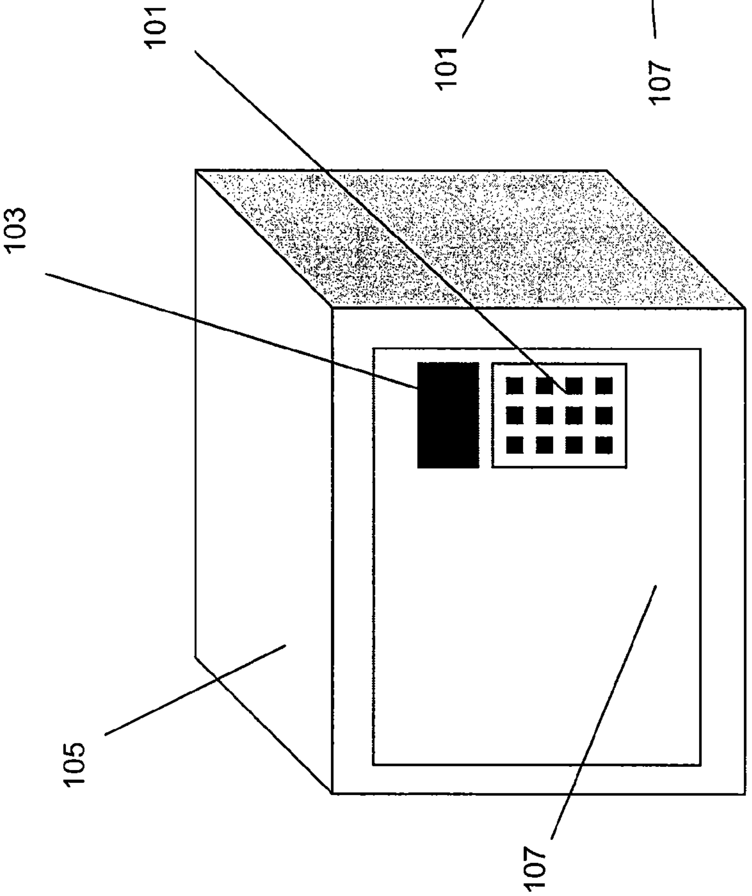
FIG. 1*a* is a perspective view of the exterior of a secured receptacle configured according to one embodiment of the invention.

One embodiment of the invention is illustrated in FIGS. 1*a* (closed and locked) and 1*b* (open and unlocked). In this embodiment, a receptacle 105 large enough to contain a parcel is used. The receptacle 105 includes a hinged door 107. For example, receptacle 105 may be a cube-shaped device placed on the ground near the front door of a home; alternatively, it may be built into the wall of a building such that hinged door 107 is flush with the exterior of the wall. The size and shape of the receptacle can be varied. For example, a recipient that receives a substantial number of large packages might prefer an oversized receptacle whereas a recipient that only receives letter-sized packages might prefer a smaller receptacle.

Installed on the exterior of receptacle 105 in this example is a keypad 101 and a display 103. Keypad 101 is shown as a twelve-button numeric keypad, but other input devices could be used including, for example, a standard QWERTY keyboard or a touch screen display. Display 103 is configured to show real-time instructions to the delivery person. Further details of such instructions are provided below. Display 103 is shown here as a segmented LCD, but other displays including, for example, a pixilated LCD, a series of LEDs, or a touch screen display could be used.

FIG. 1*b* shows receptacle 105 in its unlocked and opened state. Hinged door 107 is open and a parcel 109 has been placed inside. Hinged door 107 may be weighted such that hinged door 107 closes automatically if it is left open. Alternatively, electronic or hydraulic devices might be included to allow hinged door 107 to be opened and closed using a controller. An electronically controlled lock (not pictured) is also built into hinged door 107 and positioned to hold the receptacle 105 closed and to secure parcel 109.

Figure 2A:
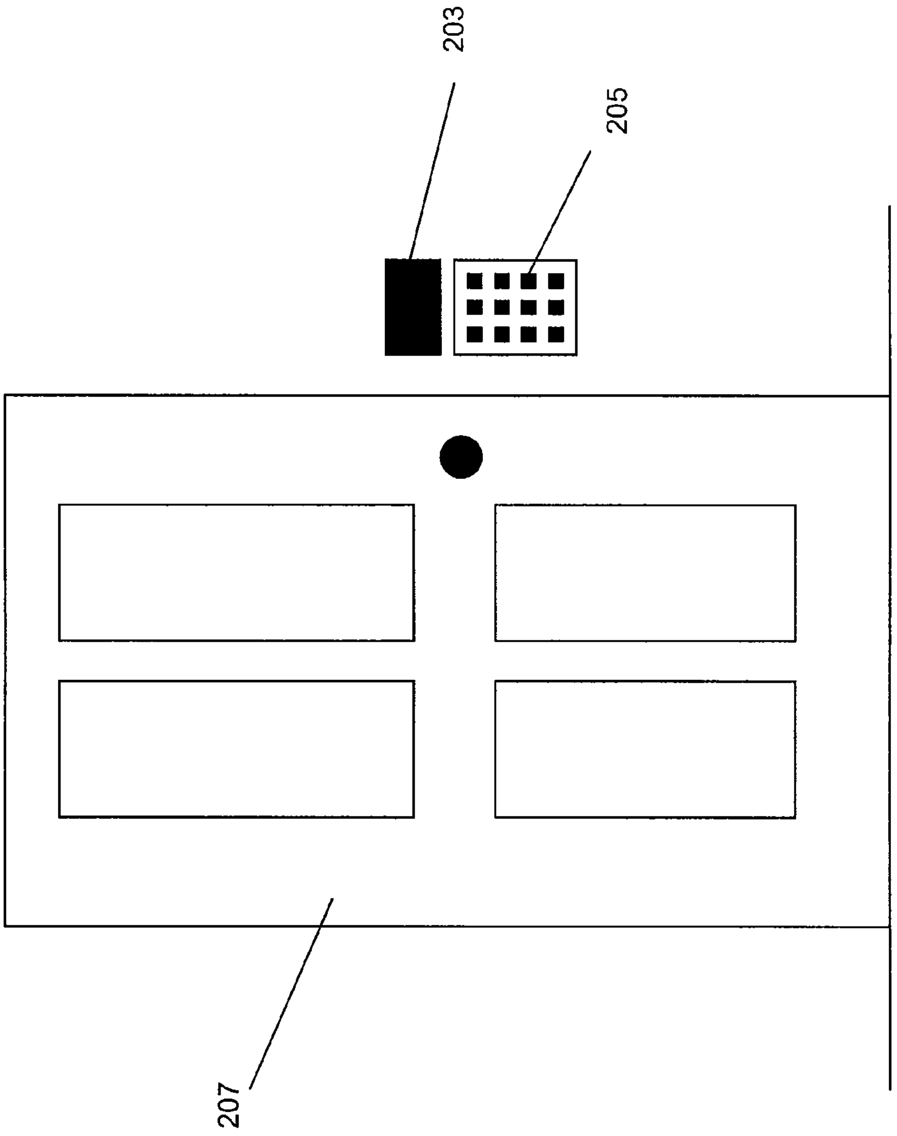
FIG. 2*a* illustrates the exterior of a secured area in a building configured according to another embodiment of the invention.
Figure 2B:
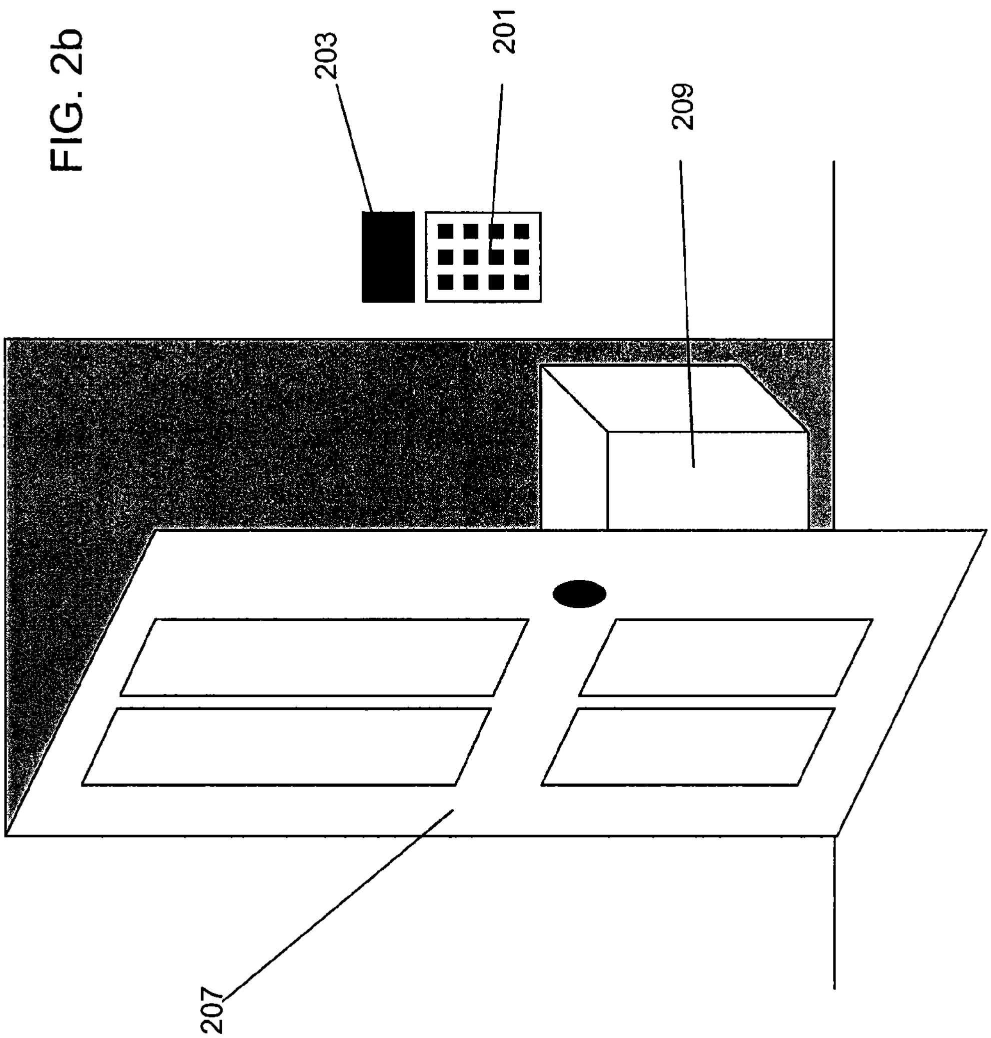
FIG. 2*b* illustrates the same secured area in a building from FIG. 2*a* with an open door and a parcel placed inside.

FIGS. 2*a* and 2*b* illustrate another embodiment of the invention. In this embodiment hinged door 207 is a door of a building and is normally closed and locked. The door 207 is operated using keypad 205 and display 203 in much the same way door 107 is operated using keypad 105 and display 103. The embodiment in FIG. 2*b*, allows for a substantially larger parcel 209 to be placed directly inside the room or building secured by door 207. Hinged door 207 may be an exterior door as shown, but could also be an interior door leading to an apartment, internal office, or other secured area within a building. The invention could also be embodied using other types of doors such as an overhead garage door (not pictured).

Figure 3:
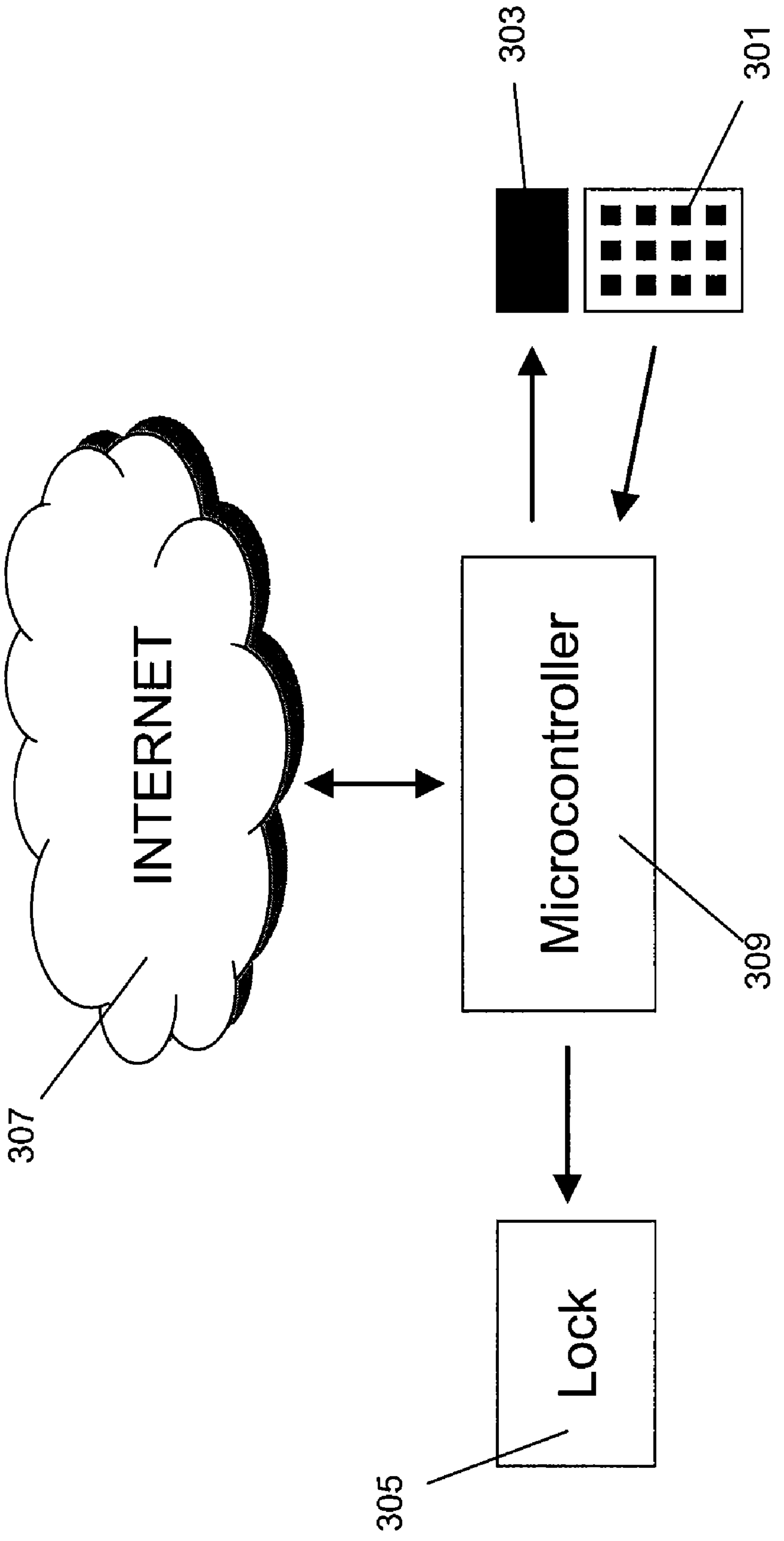
FIG. 3 illustrates the interconnectivity of components according to an embodiment of the invention.

FIG. 3 illustrates certain internal components according to one embodiment of the invention. In this embodiment, keypad 301 and display 303 are connected to a microcontroller 309. The microcontroller 309 is configured to receive input from keypad 301 and to output information to display 303. Based upon interactions with the user through keypad 301 and display 303, the microcontroller 309 disengages or engages the lock 305. In this example, lock 305 is an electromechanical lock controlled by software running on microcontroller 309.

Microcontroller 309 may be connected to the Internet 307 such that commands and data may be sent between microcontroller 309 and a remote location. In this way, microcontroller 309 can send and receive email and access Internet-based software applications as described below. The intended recipient might also utilize this Internet connection 307 to send commands and updated data to microcontroller 309 including, for example, new tracking numbers.

The invention may also be implemented in other ways. For example, the Internet connection 307 may be replaced by a direct interface to a local computer or may be removed entirely. Furthermore, microcontroller 309 might be coupled to electronic, mechanical, or hydraulic components in door 107 or door 207 such that microcontroller 309 can control the opening and closing of the door. In one embodiment, the interior of receptacle 105 is fitted with sensors coupled to microcontroller 309 (such as weight or optical sensors) such that microcontroller 309 can determine when an object (such as the parcel) has been placed inside receptacle 105.

Figure 4:
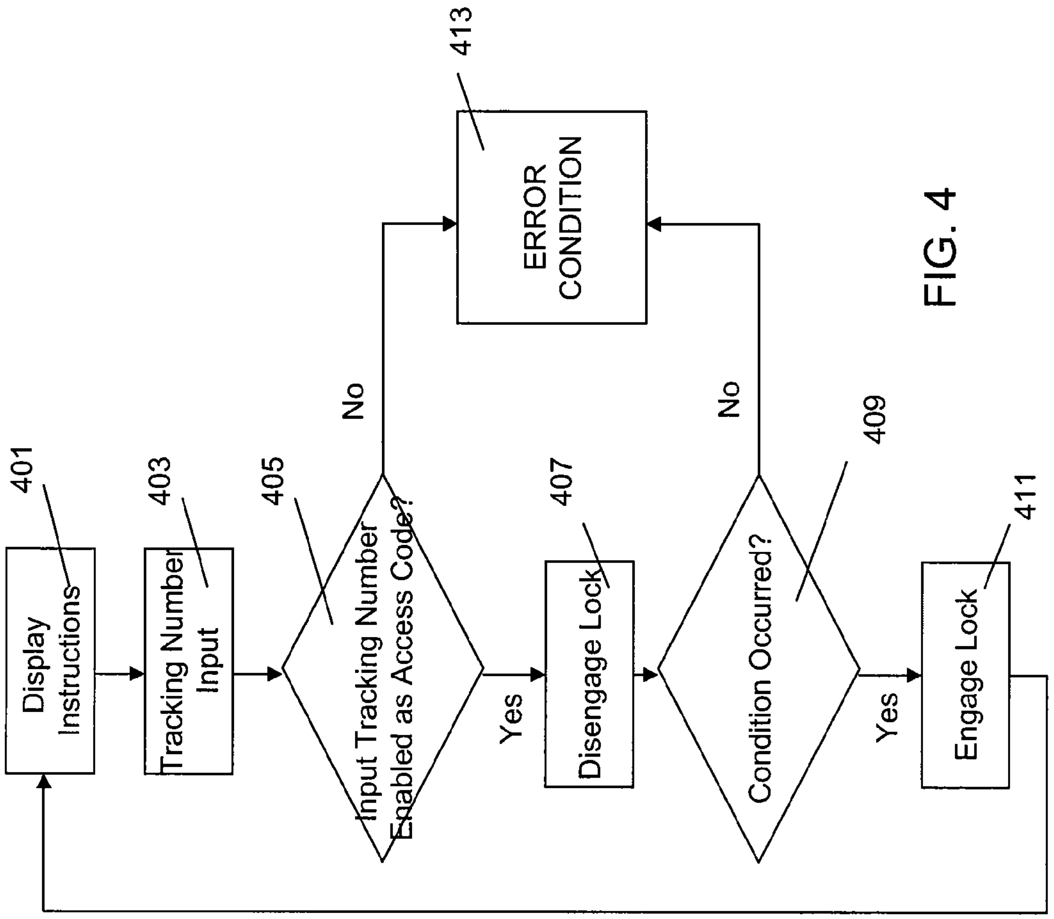
FIG. 4 illustrates the operational flow during parcel delivery in one embodiment of the invention.

The physical structures described above may be better understood with reference to FIG. 4, which describes the operational flow according to one embodiment of the invention. This example begins at step 401. At this stage, the display (e.g. 103 or 203) will show a message requesting that any delivered parcel be placed inside and instructing the delivery person in input the tracking number via the keypad (e.g. 101 or 201). When a tracking number is input (step 403), the system checks a list of tracking numbers that have been enabled as access codes (step 405). If the input tracking number has been enabled as an access code, the lock is disengaged (step 407) and the secured area can be opened. If the tracking number has not been enabled as an access code, an error condition occurs (step 413). At this point, the system may display an "error" message to display 103 (or 203). Alternatively, or additionally, the input tracking number might be recorded and the intended recipient notified of the attempted tracking number input.

After the secured area has been unlocked, the system waits for a predetermined condition (step 409) before reengaging the lock (step 411). For example, the lock might remain disengaged for 10 seconds and reengage after this time has expired. Alternatively, for example, the lock might remain disengaged until an object is detected inside the secured area using weight sensors or optical sensors.

After the condition occurs (step 409) and the lock is reengaged (step 411), the system returns to its default state 401 and displays the standard instruction message. Because the tracking number is unique to a single parcel, the system may be programmed to delete or deactivate the tracking number as an access code at this time thus preventing a delivery person from gaining subsequent access to the secured area. This optional functionality is particularly preferable if using a physical embodiment similar to the example outlined in FIGS. 2*a* and 2*b* wherein the access code provides access to an internal area in a home or business.

If the condition does not occur at 409, the system may enter an error condition (step 413). For example, if no object is placed in the secured area, the system takes corrective action such as closing and locking the door. If the system is equipped with an Internet connection 307, a notification of the error condition (step 413) is sent to the intended recipient.

Figure 5:
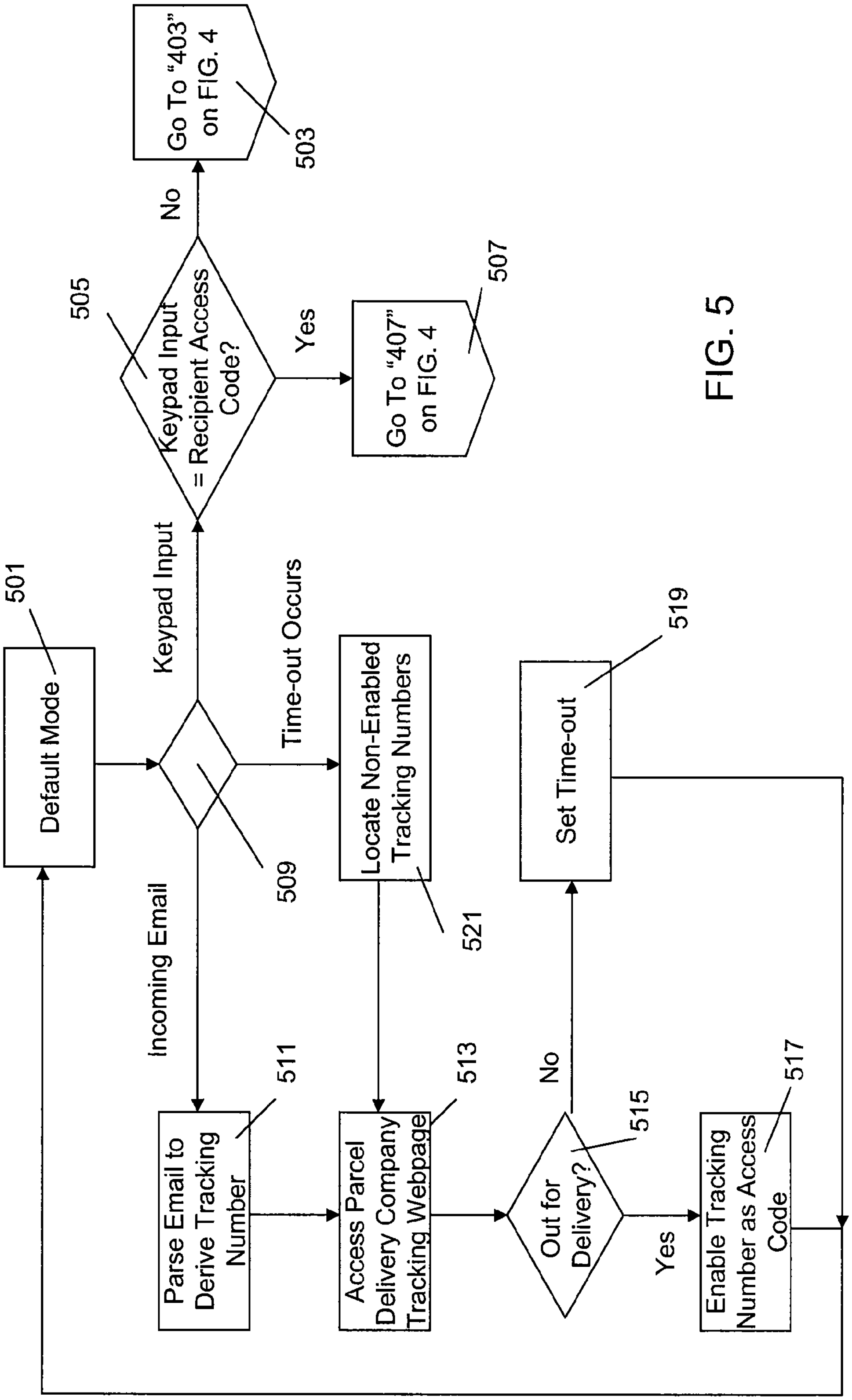
FIG. 5 illustrates the total operational flow of one embodiment of the invention.

FIG. 5 demonstrates the overall operation of another embodiment that may include the functionality illustrated in FIG. 4. Default mode 501 is similar to 401 in FIG. 4. At this stage, the system displays an instructional message while it waits for an action to occur (step 509). This action might be an incoming email, a time-out, or a keypad input. If a keypad input occurs, the input number is compared to a recipient defined access code (step 505). The recipient access code is maintained secretly by the recipient and can be used to open the secured area at anytime. The recipient access code allows the recipient access to the secured area after, for example, the parcel has been delivered and the tracking number has been deleted or disabled as an access code. If the recipient access code is identified, the system proceeds (step 507) in a manner similar to 407 on FIG. 4 by disengaging the lock. If the input is not identified as the recipient access code, the system may proceed (step 503) in a manner similar to 403 on FIG. 4 and treats the input as a potential tracking number.

Because many parcel delivery companies provide the tracking number to the recipient by email, the system in this example is configured to receive and analyze email to derive a tracking number. An example of this analysis is described below. Still referring to FIG. 5, if the system detects an incoming email at 509, it parses the email to derive the tracking number (step 511). Once the tracking number is determined, the system uses its Internet connection to access the parcel delivery company's parcel tracking system (step 513) and determine whether the package has been designated as "out for delivery" (step 515). An example of this determination is also described below.

If the parcel corresponding to the tracking number has been designated as "out for delivery" on the parcel delivery company's tracking system, the tracking number is then enabled as an access code. By enabling the tracking number as an access code only after such a designation and by disabling the tracking number as an access code immediately upon parcel delivery, the ability of unauthorized persons to gain access to the secured area is minimized to a relatively small time window. After enabling the tracking number as an access code, the system returns to default mode 501 and awaits another action (step 509).

A time-out is set (step 519) if the parcel is not designated as "out for delivery" at step 515. When the time-out expires, the system locates non-enabled tracking numbers that have been previously received and correspond to parcels in transit (step 521). The system then proceeds to step 513 and checks the status of the non-enabled tracking number. This time-out may be set, for example, to check the status every hour or once a day. The system may be further configured according to the status updating practices of each particular parcel delivery company. For example, if the company updates the status once a day at 7:00 AM, the system might be configured to execute step 521 every morning at 7:01 AM. If the company updates the status every hour on the hour, the system might be configured to execute step 521 once an hour.

It is also contemplated that the operational flow demonstrated in FIG. 5 might be adapted for systems that do not have an Internet connection. In such an embodiment, the "incoming email" and "time-out" paths are replaced with manual steps performed by the recipient. When the recipient receives a new tracking number or is informed that a parcel is "out for delivery," she manually enables the tracking number as an access code. This might be accomplished, for example through a direct connection to a local computer or through the keypad interface (e.g. 101 or 201).

As discussed above in reference to FIG. 5 (steps 509 and 511), one embodiment is configured with an Internet connection to receive emails and derive tracking numbers from received emails. In this embodiment, the recipient provides a system specific email address to the parcel delivery company. Emails sent to this address are sent to and analyzed by the system—for example, by microcontroller 309.

Figure 6:
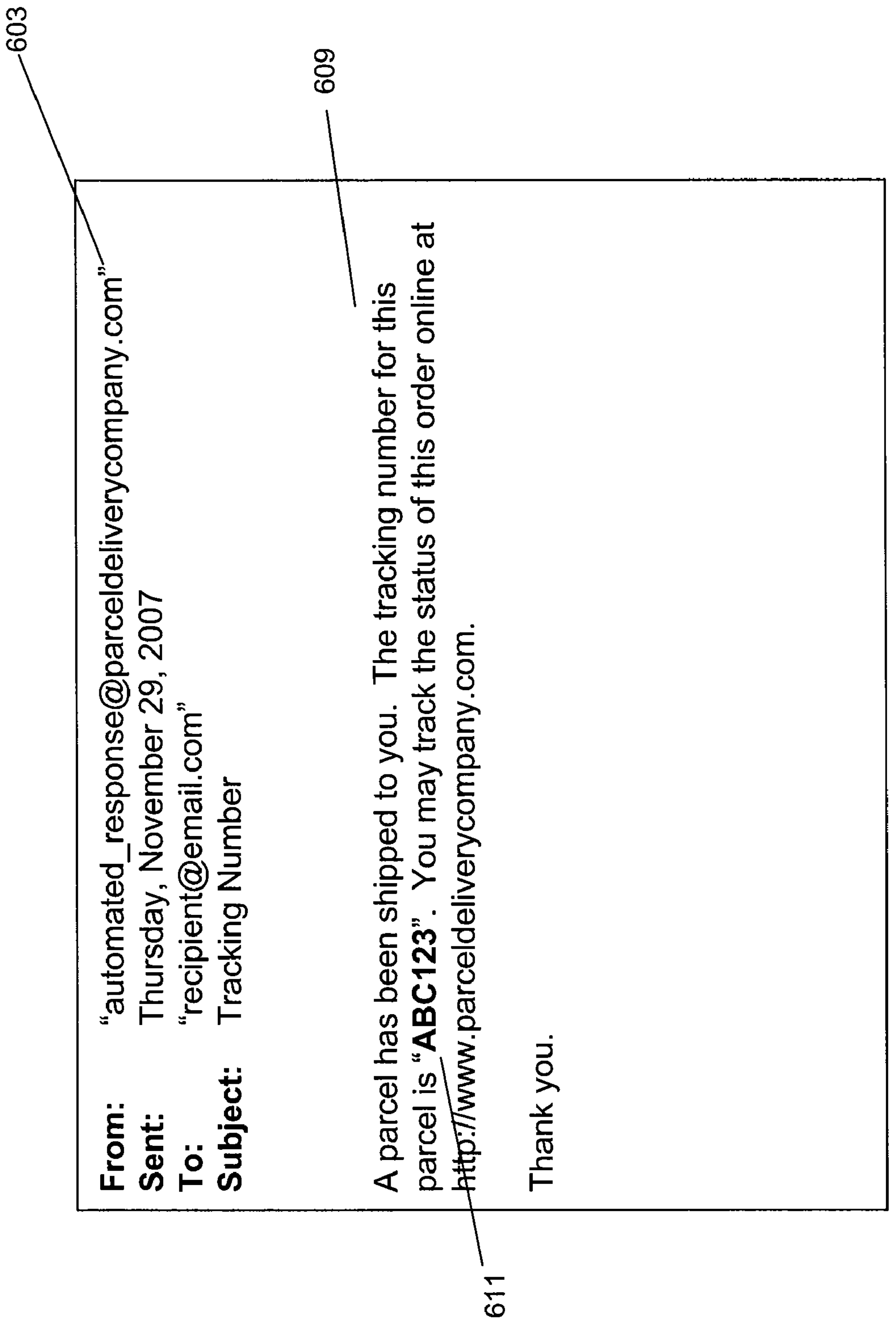
FIG. 6 illustrates an example email that is automatically generated by a parcel delivery company to inform the recipient of a tracking number.

FIG. 6 illustrates an example of an email similar to those sent by parcel delivery companies when reporting the tracking number to a recipient. These emails are typically machine generated and follow a standard format. A template is stored in the system and used to identify the "from" field 603 and distinguish the tracking number 611 from the body of the email 609.

Figure 7:
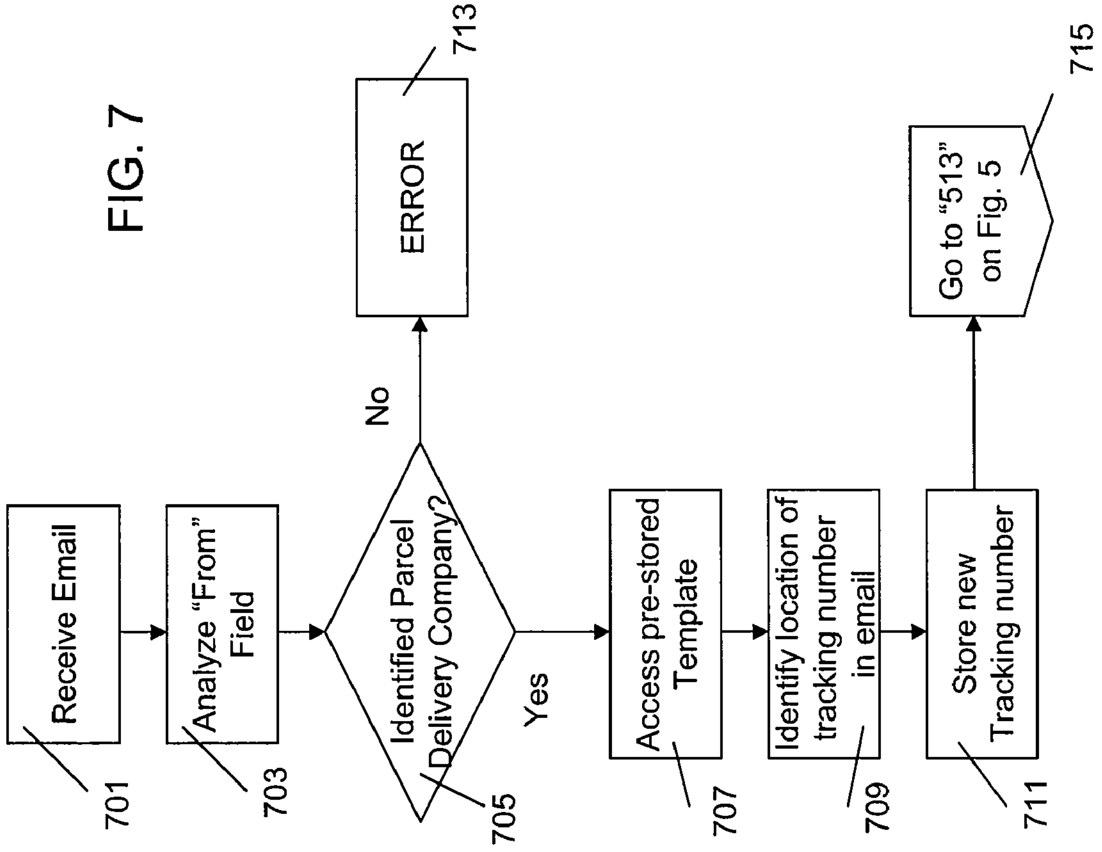
FIG. 7 illustrates the operational flow for deriving the tracking number from a received email in one embodiment of the invention.

FIG. 7 illustrates one example of email analysis such as performed at step 511 in FIG. 5. When the system receives an email (step 701), it identifies the "from" field 603 (step 703). This text is then used to identify the parcel delivery company (step 705). In the sample email of FIG. 6, the name "parcel delivery company" is included in the sender's email address. Once the parcel delivery company is identified, the pre-stored template information specific to that company is accessed (step 707). If, however, the parcel delivery company is not recognized from the "from" field 603, an error condition occurs (step 713). When the error condition occurs, the email is forwarded to the recipient for corrective action.

The template information specific to the company is then used to locate the tracking number 611 and extract it from the body of the email 609 (step 709). Extracted tracking number 611 is then stored to the system memory (step 711). At this point, the process continues to step 513 on FIG. 5 (step 715).

Figure 8A:
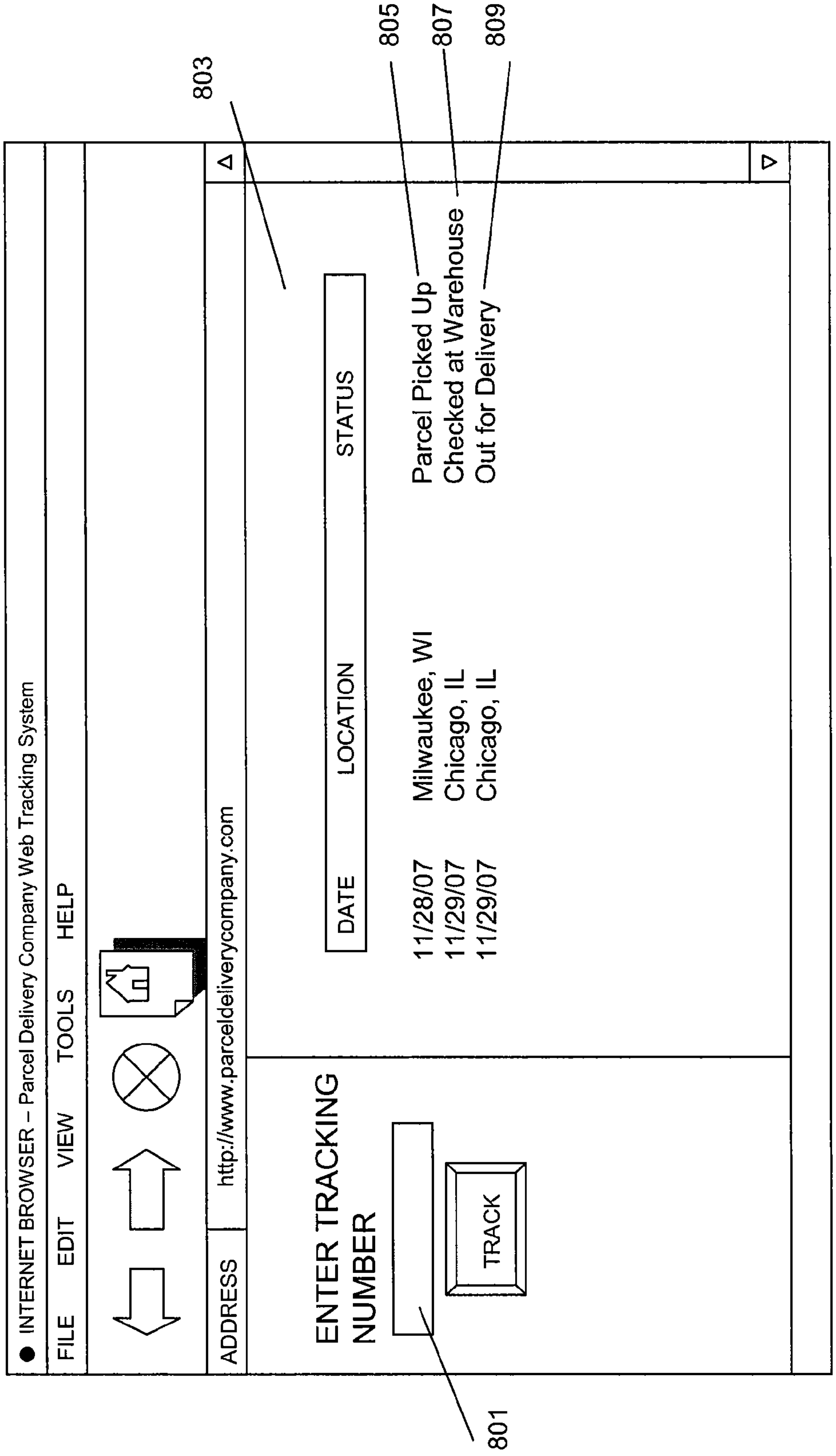
FIG. 8*a* illustrates an example of a parcel delivery company's Web-based parcel tracking software.

Many parcel delivery companies provide a Web-based interface for checking the status of a parcel. FIG. **8*a* illustrates an example of such an interface. An intended recipient inputs the tracking number into field 801 and relevant status information is displayed in table 803. In this example, entry 805 shows that the parcel was picked up in Milwaukee, entry 807 states that the parcel arrived at the warehouse, and entry 809 shows that the parcel is out for delivery in the Chicago area. As shown in FIG. 8*b*, when the screen in FIG. 8*a* is encoded using HTML, the text "Out for Delivery" 819** can be located directly in the HTML.

Figure 9:
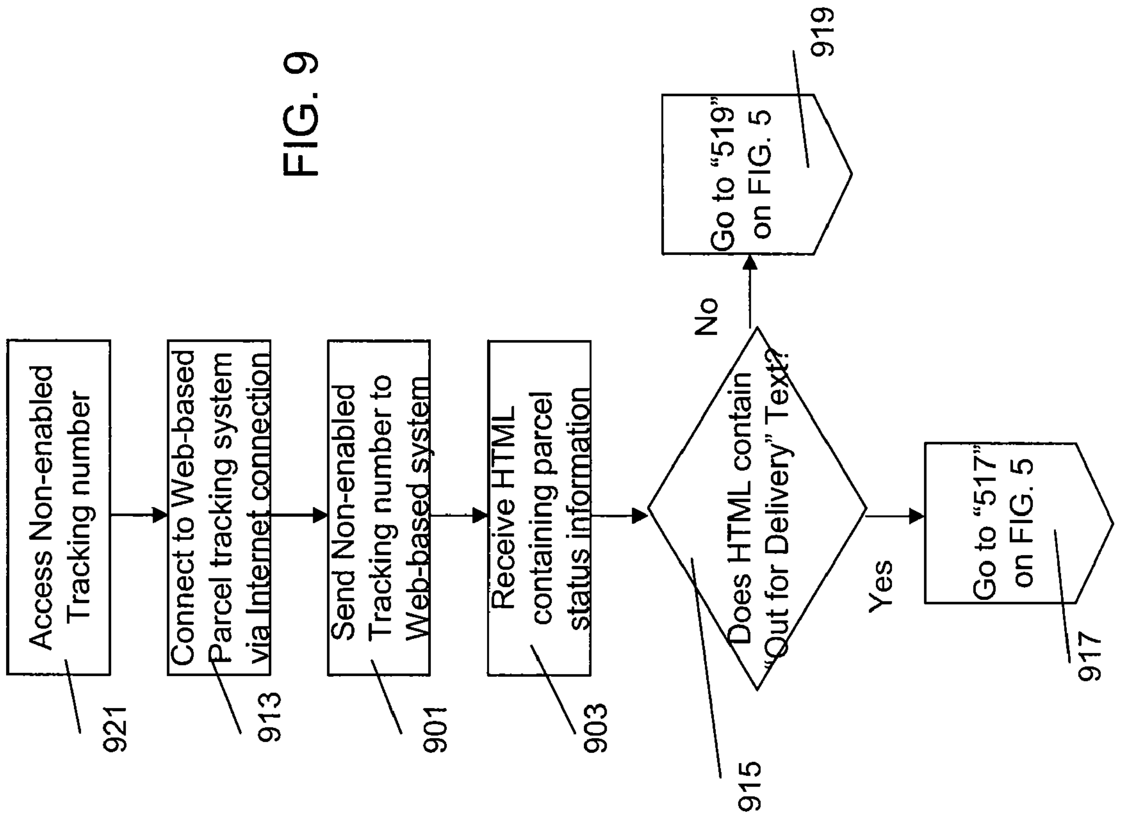
FIG. 9 illustrates the operational flow for enabling a tracking number as an access code based upon delivery status according to an embodiment of the invention.

As discussed above in reference to FIG. 5 (steps 513 and 515), an embodiment of the invention with an Internet connection might be configured to automatically check the status of a parcel using such a Web-based interface. The operational flow demonstrated in FIG. 9 is one example of an analysis such as that performed at steps 513 and 515 in FIG. 5.

A non-enabled tracking number is accessed (step 921). This might be provided from a parsed email similar to step 511, a list of previously received tracking numbers similar to those obtained through step 521, or directly input by the intended recipient. The system then connects to the parcel delivery company's Web-based tracking system (step 913) via Internet connection 307. The non-enabled tracking number is sent to the Web-based system (step 901). In the sample interface shown in FIG. **8*a*, the tracking number is sent to field 801. In response, the system receives the HTML demonstrated in FIG. 8*b* (step 903). The system then examines the received HTML and searches for an "Out for Delivery" notation (step 915). If the notation is present (step 917), the tracking number is enabled and the system proceeds to step 517 in FIG. 5. If the notation is not present, the tracking number remains in a non-enabled state and the system proceeds to step 519 in FIG. 5**.

Different parcel delivery companies use different formats and terminology in their Web-based parcel tracking systems. For example, HTML as well as XML, Java script, Flash™, and various combinations thereof may be used. Also, text other than "Out for Delivery" may be used to indicate that parcel delivery is imminent. Therefore, the system begins by identifying the parcel delivery company and then analyzes the parcel delivery status notations based upon the format and terminology specific to that parcel delivery company.

As should be understood, exemplary embodiments are described above. Other configurations and designs are possible. For example, it is understood that alternative processors are available to implement the examples discussed above. Although the embodiments discussed herein utilize a microcontroller 309, it is understood that these operations could be performed by software running on a standard personal computer that would be connected to the system or by an application server connected to the system via Internet connection 307. Various features and advantages of the invention are set forth in the following claims.

What is claimed is:

1. A method of securing delivery of a parcel, the method comprising:

constructing an access-restricted area with a portal;

fitting the portal with an electronically-controlled lock having a controller that has an input interface;

receiving, directly at the controller from a parcel delivery company over a network, a tracking number generated by the parcel delivery company as a unique identifier to track the status of a parcel;

receiving directly at the controller an email from the parcel delivery company wherein the email contains the tracking number;

electronically parsing the email to determine the tracking number;

configuring the electronically-controlled lock to unlock when a recipient access code is input to the input interface by a recipient, wherein the recipient access code is different from the tracking number and is not unique for the parcel;

enabling the electronically-controlled lock to use the tracking number as an access code to a open the electronically-controlled lock;

unlocking the electronically-controlled lock when the enabled tracking number is input to the input interface of the electronically-controlled lock by a delivery person; and locking the electronically-controlled lock after one of the group of conditions consisting of detecting the parcel within the access-restricted area or the lapse of a predetermined amount of time has occurred.

2. The method according to claim 1 further comprising disabling the tracking number as an access code after the tracking number is input to the input interface of the electronically-controlled lock.

3. The method according to claim 1 further comprising:

defining a delivery time window in which delivery of the parcel will be accepted; and comparing a current time to the delivery time window; wherein the act of unlocking the electronically controlled lock occurs when the tracking number is input by the delivery person during the delivery time window.

4. The method according to claim 1 further comprising:

accessing status information for the parcel via a parcel delivery company's Internet-based software program, and wherein the act of enabling the tracking number as an access code is performed after the parcel delivery company's Internet-based software program indicates that the parcel is out for delivery.

5. The method according to claim 1 further comprising sending an electronic notification to a recipient after the tracking number is input to the input interface by the delivery person.

6. The method according to claim 1 further comprising sending an email to a recipient by the controller of the electronically-controlled lock after the tracking number is input to the input interface.

7. The method according to claim 1 further comprising displaying on a display a request that the parcel be placed inside a secured area; and displaying on the display instructions for operating the electronically controlled lock to the delivery person.

8. A system for securing a delivered parcel comprising:

a secured area with a portal held closed by an electronically controlled lock having a processor; and a user interface configured to receive a tracking number from a delivery person;

the processor configured to receive directly an email from a parcel delivery company through an Internet connection wherein the email contains the tracking number, and parse the email to derive the tracking number, and store the tracking number as an access code to the electronically controlled lock, and unlock the electronically controlled lock when the tracking number is input by the delivery person, wherein the tracking number is generated by the parcel delivery company as a unique identifier for tracking the status of a parcel.

9. The system according to claim 8 wherein the processor is further configured to disable the tracking number as an access code after the tracking number is input by the delivery person.

10. The system according to claim 8 wherein the processor is further configured to unlock the electronically controlled lock when a recipient access code is input by a recipient, wherein the recipient access code is not unique for the specific parcel.

11. The system of claim 8 wherein the processor is further configured to access status information for the parcel via the parcel delivery company's Internet-based software program; and enable the tracking number as an access code after the parcel delivery company's Internet-based software program indicates that the parcel is out for delivery.

12. The system of claim 8 wherein the secured area is includes a receptacle with a door that is held closed by the lock.

13. The system of claim 8 wherein the secured area is includes an interior area of a building.

14. The system of claim 8 wherein the processor is further configured to send an electronic notification to a recipient after the tracking number is input by the delivery person.

15. The system of claim 14 wherein the electronic notification includes an email sent through the Internet connection.

16. The system of claim 8 further comprising a display wherein the display is configured to request that the parcel be placed inside the secured area and provide instructions for operating the lock.

17. The system of claim 8 wherein the user interface is includes a keypad.

18. The system of claim 8 wherein the user interface is includes a touch screen.

19. A system for securing a delivered parcel comprising:

a secured area with a portal held closed by an electronically controlled lock having a processor;

a user interface configured to receive a tracking number from a delivery person;

a display; and a wide-area network ("WAN");

the processor configured to receive directly an email from a parcel delivery company through the WAN, wherein the email contains the tracking number, parse the email to determine the tracking number, access status information for the parcel via a parcel delivery company's WAN-based software program, enable the tracking number as an access code to the electronically controlled lock after the parcel delivery company's Internet-based software program indicates that the parcel is out for delivery, output to the display a request that the parcel be placed inside and instructions for operating the lock, unlock the electronically controlled lock when the enabled tracking number is input by the delivery person, disable the tracking number after the tracking number is input by the delivery person, and lock the electronically controlled lock;

wherein the tracking number is generated by a parcel delivery company as a unique identifier for tracking the status of a parcel.

* * * * *

UNITED STATES PATENT AND TRADEMARK OFFICE

CERTIFICATE OF CORRECTION

PATENT NO. : 7,815,112 B2
APPLICATION NO. : 11/965527
DATED : October 19, 2010
INVENTOR(S) : Dante P. Volpe et al.

It is certified that error appears in the above-identified patent and that said Letters Patent is hereby corrected as shown below:

Title Page
(75) Inventors: "Dennis M. Petricoin" should read --Dennis M. Petricoin, Jr.--.

Col. 8, line 34, delete the word "is".

Col. 8, line 37, delete the word "is".

Col. 8, line 48, delete the word "is".

Col. 8, line 50, delete the word "is".

Signed and Sealed this
Fifth Day of April, 2011

David J. Kappos
*Director of the United States Patent and Trademark Office*